United States Patent [19]

Petrovich et al.

[11] Patent Number: 4,785,700
[45] Date of Patent: Nov. 22, 1988

[54] CUTTER LINK FOR SAW CHAIN HAVING GUIDE SURFACE FOR SHARPENING

[75] Inventors: Michael V. Petrovich, Portland; Duane M. Gibson, Milwaukie; Kent L. Huntington, Molalla; Kenneth R. Day, Clackamas, all of Oreg.

[73] Assignee: Blount, Inc., Portland, Oreg.

[21] Appl. No.: 51,286

[22] Filed: May 19, 1987

[51] Int. Cl.$^4$ .............................................. B27B 33/14
[52] U.S. Cl. ......................................... 83/834; 83/830
[58] Field of Search ................................ 83/830-834; 30/138

[56] References Cited

U.S. PATENT DOCUMENTS

| 3,380,496 | 4/1968 | Hill | 83/830 |
| 4,581,968 | 4/1986 | Gibson et al. | 83/833 |
| 4,625,610 | 12/1986 | Petrovich | 83/834 |

Primary Examiner—Frank T. Yost
Assistant Examiner—Hien H. Phan
Attorney, Agent, or Firm—Robert L. Harrington

[57] ABSTRACT

A cutting link having a cutter portion and a depth gauge. And a guide edge extending between the depth gauge peak and cutter portion for guiding a file to sharpen the cutting edge of the cutter portion. In the process of sharpening the cutting edge, the cutter portion is abraded away along a line that furthers the guide edge and thereby continues the guiding of the file to properly file the cutting edge.

5 Claims, 2 Drawing Sheets

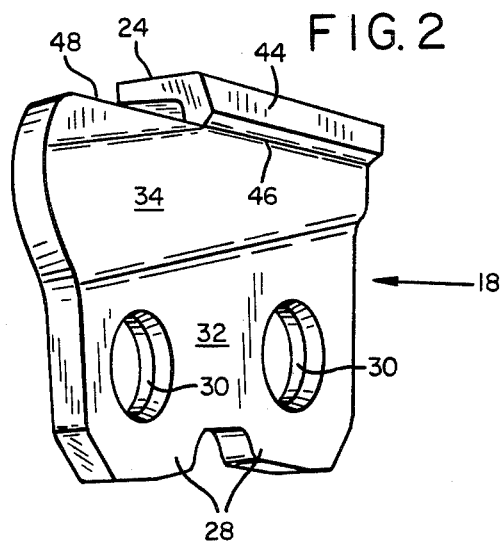
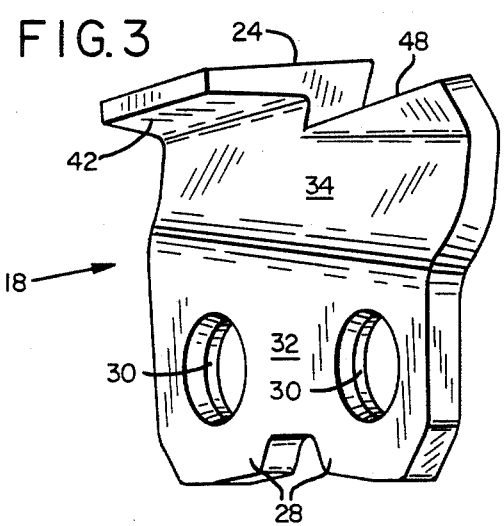
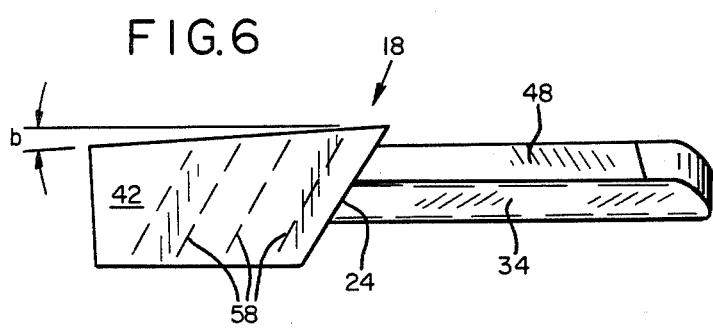
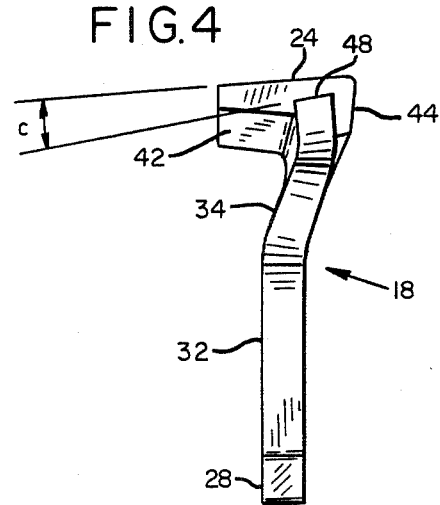
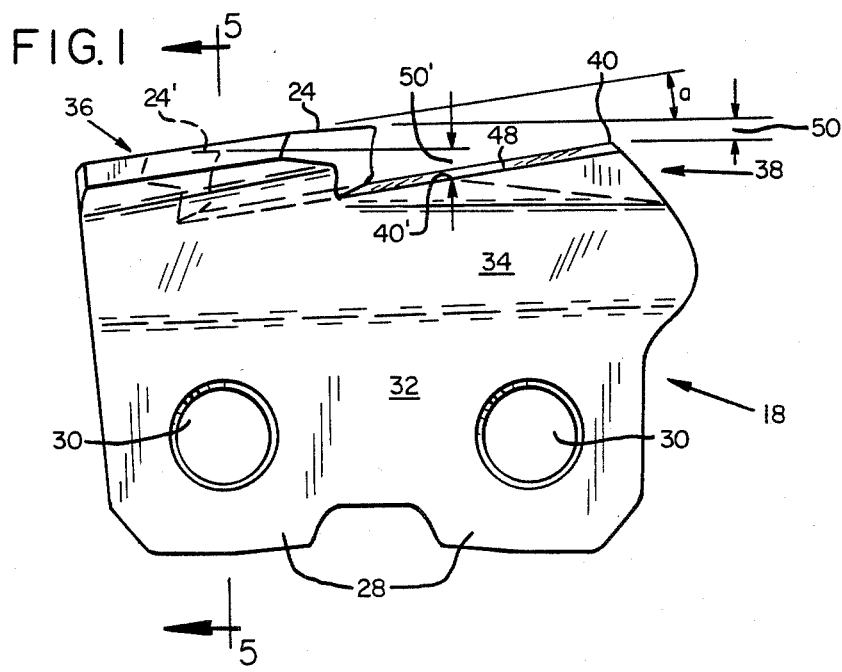
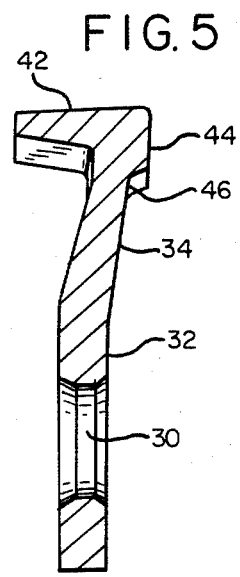

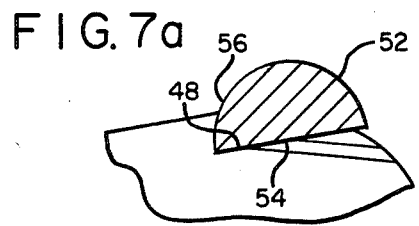
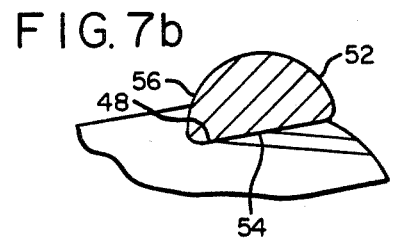
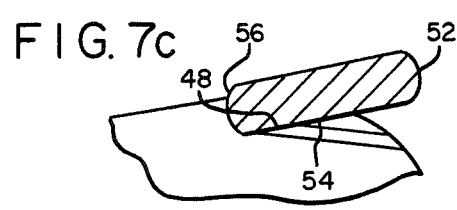
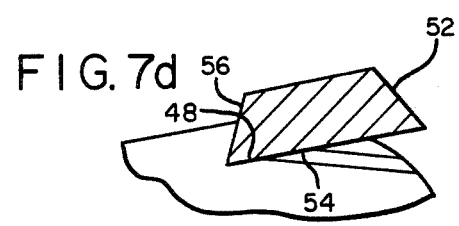
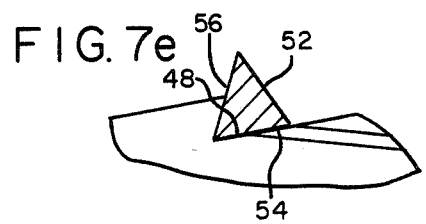
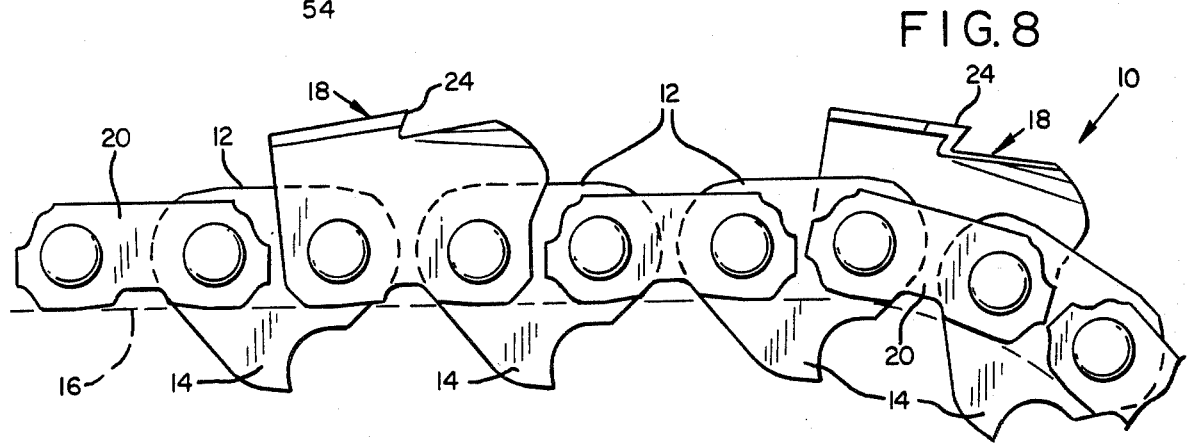
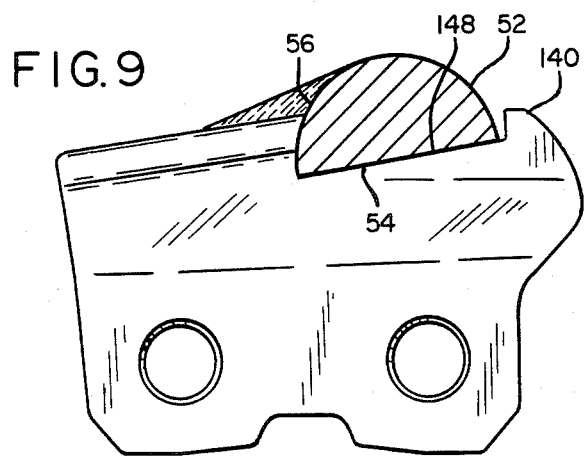

CUTTER LINK FOR SAW CHAIN HAVING GUIDE SURFACE FOR SHARPENING

FIELD OF INVENTION

A cutting link having a gullet including an elongated sloped guide surface that accomodates a file having a non-abrading guide portion for guiding an abrading portion thereof to sharpen the cutting edge of the cutting link.

BACKGROUND OF THE INVENTION

Since saw chain for chain saws was first developed, a major concern has been maintaining the cutting edges. Many inventions have been directed to making the job of sharpening the saw chain easier, faster and more accurate. The present invention is believed to provide a further step in this progression of inventions for simplifying the sharpening process.

The saw chain cutting link contemplated herein consist of a body portion, an outwardly extended cutter portion formed into a C or L shape with a leading cutting edge, and a second outwardly extended portion in front of and spaced forward of the cutter portion forming a depth gauge. The space between the cutter portion and depth gauge portion is referred to as a gullet. The cutter portion is elongated so that, as the cutting edge dulls, it can be repeatedly sharpened. This shortens the cutter portion length and increases the gullet spacing until further sharpening is no longer feasible, a point at which the cutting link reaches "end-of-life".

Typically the cutting edge is sharpened with a round file that is positioned at the appropriate angle and depth within the gullet. The file is maintained in that relative position as it is drawn across the edge of the cutter. A variety of file guide accessories have been developed to assist in locating and maintaining the relationship during sharpening.

SUMMARY OF THE INVENTION

The present invention resides in a change in the configuration of the cutter portion, depth gauge, gullet and file, all of which are coordinated to provide for guide assisted sharpening, but eliminating the need for a file guide accessory.

The depth gauge is essentially a blunted, leading outer "peak" that limits the ability of the cutting edge of the cutter portion to penetrate the wood surface. This peak is positioned substantially forward of the cutting edge. A straigth edge following the peak (referred to as a guide edge) is angled rearwardly and inwardly from the depth gauge to the base of the cutter portion, i.e. below the cutting edge thereof. The cutter portion is designed to be abraded and thereby worn away by sharpening at a rearwardly and inwardly directed angle that coincides with the angle of said guide edge. The line that is followed in abrading away the cutter portion is referred to as the base line. The gullet is defined as that space between the cutting edge and depth gauge peak, above said guide edge.

A file is configured with a flat guide surface that, when mated to the straight edge preceeding the cutter portion, presents an abrading surface that abrades away the entire cutter portion and thereby extends the guide edge along the base line of the cutter portion. The abrading surface concurrently sharpens the cutting edge.

PRIOR ART

The most pertinent prior art is believed to be disclosed in U.S. Pat. No. 3,380,496 issued to E.H. Hill on Apr. 30, 1968. Hill illustrates a depth gauge peak (47) and a trailing guide surface (45) terminating at the base (46) of the cutting edge (27). A file is provided with a smooth guide surface (51). A base line (23) establishes the desired removal of the cutter portion.

In Hill, the guide surface, cutter portion and file are coordinated to initially guide the file properly for filing. But as soon as any material is removed, guide surface 45 is no longer effective as a guide for the file. Furthermore, the base line 23 does not encompass the full cutter portion. Because the cutter portion of a typical cutting link is laterally offset to provide side relief, the portion of the offset that is below line 23 and which is not removed during sharpening, after several sharpenings, produces interference. (In the context of this invention, the cutter portion as differentiated from the body portion is considered to be delineated by the side relief offset.)

The present invention is an improvement over Hill in providing a continuation of the guide edge and a substantially total removal of the cutter portion, both due to the novel manner of coordinating the elements of the cutter portion (e.g. the base line), the guide edge of the depth gauge, and the file configuration. Because the guide surface of the file is flat, the leading surface of the file removes only the cutter portion above the base line. The guide edge is contained along a substantially straight line, generating the desired cutting edge configuration. The process is simple and convenient and eliminates the need for an accessory file guide. The improvements and the benefits therefrom will be further understood and appreciated by reference to the following detailed description. The drawings attached hereto and referred to in the detailed description are briefly described as follows:

FIG. 1 is a side view of a cutting link of a saw chain in accordance with the invention;

FIG. 2 is a perspective view from one side of the cutting link of FIG. 1;

FIG. 3 is a perspective view from the other side of the cutting link of FIG. 1;

FIG. 4 is an end view of the cutting link;

FIG. 5 is a section view as taken on section lines 5—5 of FIG. 1;

FIG. 6 is a top view of the cutting link of FIG. 1;

FIGS. 7a-7e are illustrations of various sharpening tools in cross section, positioned for sharpening a cutting link in accordance with the invention;

FIG. 8 illustrates a cutting chain utilizing cutting links in accordance with the present invention; and FIG. 9 is a side view of an alternate embodiment of a cutting link in accordance with the invention.

Reference is first made to FIG. 8 illustrating a series of links making up a saw chain 10. The links are pairs of side links interconnected to center links in repeating sequence. The center links are drive links 12 having drive tang portions 14 adapted to ride in the groove of a guide bar. A portion of a guide bar is illustrated as dash line 16. Certain pairs of the side links have a cutting link 18 mated on the opposite side with a tie strap 20. It will be noted that the cutting links 18 alternate from side to side and are either right or left hand cutters which are mirror images to each other as is common for such saw chain makeup. Other pairs of side links are both tie straps 20.

Reference is now made to FIGS. 1 through 6 which illustrates a left hand cutting link 18 in a variety of views. The cutting link includes a lower body portion 32 which generally simulates the configuration of a tie strap having rivet openings 30 located above front and rear foot portions 28 that slide on the bar rail (see FIG. 8).

An upper body portion 34 is shaped into the desired form to include a cutter portion 36 with cutting edge 24, and depth gauge portion 38, terminating in an outer peak 40.

The cutter portion 36 is bent first outwardly and then sharply across the body of the cutting link to form a side plate 44 and top plate 42. As will be noted particularly from FIG. 5, the side plate 44 projects laterally outwardly from the upper body portion 34 and is deliniated by a bend or base line 46, best seen in FIG. 2. The bend line 46 is preferably generated by a coining operation to specifically establish the portion thereabove as the cutter portion of the cutting link.

As is typical for cutting links, relief angles are established including a top relief angle "a" (FIG. 1) and a side relief angle "b" (FIG. 6). An angle "c" (FIG. 4) is also typical. What is not typical is the relationship of the guide edge 48 of the depth gauge portion 38 and the cutter portion 36, whereby the guide edge 48 forms an extension of bend line 46 or vise versa.

To accomplish these desired relationships, several factors must be coordinated. The height differential (arrows 50) between the top edge of cutting edge 24 and the peak 40 of depth gauge 38 must be established to assure the desired penetration of the cutter during the cutting operation. The bend line 46 in relation to the side plate and top plate must be consistent so that an appropriately configured file (FIGS. 7a–7e) will remove the cutter portion above line 46 while also maintaining a continuation of the cutting edge 24. The file should be configured with a non-abrading lower guide surface that cooperates with guide edge 48 while sharpening the cutting edge 24 so that the file removes the top plate and at the same time generates a continuation of the guide edge 48.

Because sharpening lowers the height of the cutting edge 24, as is typical, the peak 40 of the depth gauge must be filed down (also thereby drawing it back along guide edge 48) to retain the desired height differential. This is illustrated in FIG. 1 in dash lines and indicated by numbers with prime marks, i.e. 50' refers to arrows that indicate the height relationship between cutting edge 24' at end-of-life and the reduced peak 40'.

The slope of lines 46, 48 as viewed in FIG. 1 in part dictates the spacing front to back between the cutting edge 24 and peak 40. The other factors are the height of the top plate cutting edge 24 from the base line 46 and the desired depth gauge setting, i.e. between arrows 50. The relationship can be described as a mathematical formula as follows: the lengthwise distance between cutting edge 24 and peak 40 is determined by the quantity, the difference between the height of the cutter portion (edge 24 to line 46) and the depth gauge setting, divided by the slope of guide surface 48. The length of the cutter portion when new, i.e. which in turn determines the life of the cutting link, is determined by the length of the cutting link less this spacing between the cutting edge and depth gauge peak.

Referring to a specific example, a cutting link 18 is about 0.72 inches in length (e.g. for a ⅜ inch pitch chain), the height of the cutting edge 24 above the base line 46 is about 0.075 inch and the desired depth gauge setting is 0.030 inch. Providing an angle "a" of about 10 degrees generates a slope of about 8 to 1 for base line 46 and guide edge 48. Peak 40 is then spaced forwardly of cutting edge 24 by the amount equaling 0.075 times 8 times (0.075−0.030/0.075). The spacing between edge 24 and peak 40 is thus about 0.36 inch. That is about half of the length of the link (0.72 inch) and thus the length of the cutter portion 36 at beginning of life is also 0.36 inch.

Reference is now made to FIGS. 7a through 7e which illustrates various cross sectional configurations of a file 52. The shape of the file varies to accomodate different cutting edge shapes. In each case the file has a flat non-abrading guide surface 54 that slides on guide edge 48 of the cutting link. In each case the file guide has an abrading edge surface 56 that engages the cutter portion to sharpen edge 24. The cutter portion above base line 46 is removed in the process which extends guide edge 48. (Dash lines in FIG. 1 indicate the configuration of the cutter after a number of sharpenings.)

It is to be noted that the continuation of guide edge 48 rearward along base line 46 can be difficult to achieve precisely. However, a small variation is tolerable. In general, there is a tendency to slightly bend the direction of the guide edge upwardly from the guide line during the sharpening process. This tendency can be accommodated by slightly bending the baseline upwardly from true alignment with the indicated guide edge.

Another variation to be considered is the provision of an initial elevated depth gauge peak 140 as illustrated in FIG. 9. The guide edge 148 is stepped down from the peak 140 in the start-of-life condition of the cutting link. As the top plate 42 is abraded back along the base line 146, peak 140 is continuously lowered until eventually it merges with the guide edge 148. Such a configuration complicates somewhat the production of the cutting link but relaxes the geometric relationship as described for the preferred embodiment.

It should be appreciated that the sharpening process is not accomplished without the use of some skills in matching the angle of the file to the cutting edge shape. Thus whereas the guide edge 48 guides the file at the appropriate height and lateral angle, the filer will have to maintain the desired rearward slope of the file as he draws the file across the cutting edge. It is common to provide the file guide previously used with a guideline to assist in establishing this angle. It is proposed for the embodiment of the invention disclosed herein that guidelines 48 be provided to assist the filer in establishing the proper filing angle.

Whereas others having skill in the art conceive of variations to the embodiments herein described, the invention is considered to encompass such variations in accordance with the claims appended hereto.

We claim:

1. A cutting link adapted for cutting in a forward direction with an upper cutting edge thereof comprising: a lower body portion having means for accommodating pivotal interconnection with preceding and following links in a saw chain, and in an upper body portion configured into a cutter portion and a depth gauge portion, said cutter portion including a top plate having a leading cutting edge, said top plate extending downwardly and rearwardly at a determined angle from the cutting edge toward said lower body portion, the depth gauge portion having a depth gauge peak that is lower in heighth than the cutting edge by a determined distance thereby establishing a depth gauge setting, and a guide edge extending from the depth gauge peak toward the cutting edge at substantially the same angle as the top plate angle, said guide edge being adapted to guide a file along a non-abrading guide surface for sharpening the cutting edge and for substantially abrading away the cutter portion along a path substantially paralleling said angle of the top plate, and said guide edge angle defines a rearwardly directed downward slope and the lengthwise distance between the cutting edge and the depth gauge peak is determined by a value obtained by dividing the difference between the heighth of the cutter portion above the guide edge at the point of intersection and the depth gauge setting by the slope of the guide edge.

2. A cutting link as defined in claim 1 wherein the cutter portion is delineated by a base line, and said guide edge extending from the base line below the cutting edge to the depth gauge peak.

3. A cutting link as defined in claim 1 wherein the height of the top plate cutting edge above the baseline is about 0.075 inch, the depth gauge setting is about 0.030 inch and the angle of the baseline from the horizontal is about 10 degrees.

4. A cutting link adapted for cutting in a forward direction with an upper cutting edge thereof comprising: a lower body portion having means for accommodating pivotal interconnection with preceding and following links in a saw chain, and an upper body portion configured into a cutter portion and a depth gauge portion, said cutter portion being delineated by a base line above which the cutter portion bends outwardly and is relieved rearwardly in forming the desired cutting edges, said cutter portion including a top plate having a leading cutting edge, said top plate extending downwardly and rearwardly at a determined angle from the cutting edge toward said lower body portion, the depth gauge portion having a depth gauge peak that is lower in heighth than the cutting edge by a determined distance thereby establishing a depth gauge setting, and a guide edge extending from the depth gauge peak toward the cutting edge at substantially the same angle as the top plate angle, said cutter portion base line being substantially a continuation of said guide edge whereby said guide edge is adapted to guide a file having a non-abrading guide surface for sharpening the cutting edge and for substantially abrading away the cutter portion along said base line substantially paralleling said angle of the top plate.

5. A cutting link as defined in claim 4 wherein the cutter and depth gauge portions at start-of-life, each occupy about half the lenght of the cutting link.

* * * * *